US012666191B2

(12) United States Patent
Tang et al.

(10) Patent No.: US 12,666,191 B2
(45) Date of Patent: Jun. 23, 2026

(54) HEADBAND AND HEADPHONES

(71) Applicant: Anker Innovations Technology Co., Ltd., Changsha (CN)

(72) Inventors: Wenchao Tang, Shenzhen (CN); Yunji Chen, Shenzhen (CN)

(73) Assignee: Anker Innovations Technology Co., Ltd., Shenzhen (CN)

( * ) Notice: Subject to any disclaimer, the term of this patent is extended or adjusted under 35 U.S.C. 154(b) by 28 days.

(21) Appl. No.: 18/634,095

(22) Filed: Apr. 12, 2024

(65) Prior Publication Data

US 2024/0348965 A1 Oct. 17, 2024

(30) Foreign Application Priority Data

Apr. 17, 2023 (CN) ........................ 202320855761.X

(51) Int. Cl.
*H04R 1/10* (2026.01)

(52) U.S. Cl.
CPC ........... *H04R 1/105* (2013.01); *H04R 1/1008* (2013.01)

(58) Field of Classification Search
CPC .............................. H04R 1/105; H04R 1/1008
See application file for complete search history.

(56) References Cited

U.S. PATENT DOCUMENTS

2011/0002497 A1* 1/2011 Fukuma ............... H04R 5/0335 381/384
2015/0245124 A1* 8/2015 Lee ........................ H04R 1/105 381/378

FOREIGN PATENT DOCUMENTS

CN 218103458 U 12/2022

OTHER PUBLICATIONS

Machine translation of CN218103458U (Year: 2022).*
Sep. 16, 2024 (EP) Search Report of EP 24170238.
HD 4.40BT Wireless Headphones: Instruction Manual, SCBT6, Sennheiser 2024. Accessed: Apr. 12, 2024. [Online]. Available: https://assets.sennheiser.com/global-downloads/file/7876/HD440BT_IM_EN, pp. 1-37.pdf.
Noise Cancelling Hadphones 700, User Manual, Bose Corporation, Farmingham, MA, 2022. pp. 1-60.
AONIC 50 Gen 2. Wireless Headphones. User guide for Shure AONIC 50 Gen 2 wireless headphones. Version: 1.1. Shure Incorporated, 2024. pp. 1-24.

* cited by examiner

*Primary Examiner* — Andrew Sniezek
(74) *Attorney, Agent, or Firm* — Banner & Witcoff, Ltd.

(57) ABSTRACT

This application discloses a headband and headphones, and the headband includes an integrally arc-shaped frame. The frame comprises: multiple joint structures arranged along the extension direction of the frame; multiple pivot axles, where two adjacent joint structures are rotatably connected by at least one pivot axle. In an example, an axial direction of the pivot axle is parallel to the axial direction of the frame, allowing the two adjacent joint structures to rotate relative to each other around the axis of the pivot axle, and enabling the frame to switch between a folded state and an unfolded state. The multiple joint structures include at least one joint structure (e.g., a first joint structure), which includes a plastic part and a spring clip that are integrally injection-molded together. The example headband can reduce storage space and increase portability, while enhancing the stability and reliability of the headband.

21 Claims, 8 Drawing Sheets

HEADBAND AND HEADPHONES

The present application claims priority to CN Application No. 202320855761. X, filed on Apr. 17, 2023. The above application is incorporated by reference in its entirety.

FIELD

This application relates to the field of headphone technology, particularly to a type of headband and headphones.

BACKGROUND

Headband devices such as headphones are highly popular among users because of their easy-to-wear performance. However, the headband of headband devices is generally larger in size, and often has limited adjustability, which results in increased storage space when the headband is being stored, and inconvenience to carry it around.

SUMMARY

This application provides a headband and headphones that can reduce the storage space occupied by the headband when stored, increase its portability, and at the same time, improve the stability and reliability of the headband.

Firstly, this application provides a headband, which includes an arc-shaped frame. The frame comprises: multiple joint structures, which are arranged along an extension direction of the frame; multiple pivot axles, where at least one pivot axle rotationally connects two adjacent joint structures, with an axial direction of the pivot axle being parallel to an axial direction of the frame, allowing the adjacent joint structures to rotate relative to each other around the axial direction of the pivot axle, and enabling the frame to switch between a folded state and an unfolded state; wherein the multiple joint structures include at least one joint structure such as a first joint structure, which consists of a plastic part and a spring piece, with the plastic part and the spring piece being integrally injection-molded.

Secondly, this application provides a pair of headphones, which comprises a first earphone unit, a second earphone unit, and a headband. The first earphone unit is connected to one end of the frame, and the second earphone unit is connected to the other end of the frame. In some examples, the frame includes an arc-shaped frame having at least four joint structures arranged in series along an extension direction of the frame, wherein each joint structure is pivotally coupled to adjacent joint structures. In some examples, the arc-shaped frame has at least five joint structures. In some examples, the arc-shaped frame has at least six joint structures. In some examples, the arc-shaped frame has at least seven joint structures. In some examples, the arc-shaped frame has at least eight joint structures. In some examples, the arc-shaped frame has at least nine joint structures. The joint structures may be the same or different in their structures or configurations.

The embodiments of this application include at least the following beneficial technical effects: when the headband is not in use, the frame can be folded by rotating each joint structure around the axis of the pivot axle, causing the frame to enter a folded state, thereby allowing the headband to enter a folded state. This significantly reduces the spatial volume of the frame when it is in the folded state, thereby reducing the spatial volume of the headband, and making the headband more convenient to carry. In addition, the spring clip has a certain degree of elasticity, and when the headband is worn on the head, the elasticity of the spring clip ensures that the headband maintains a good clamping force in the expanded state, making the connection between the headband and a person's head more secure and preventing the headband from falling or slipping off the head. Moreover, the plastic part has the advantages of being lightweight, having a simple processing technology, and high processing precision. By integrally molding the plastic part with the spring clip to form the first joint structure, the overall weight and processing difficulty of the first joint structure can be reduced, and the processing precision of the first joint structure can be improved. This ensures a more precise assembly between each of the first joint structures, and at the same time, the spring clip is less likely to separate from the plastic part, making the overall performance of the first joint structure more stable and less prone to loosening, thereby enhancing the stability and reliability of the headband.

BRIEF DESCRIPTION OF THE DRAWINGS

To more clearly illustrate the examples or related technology of this application, a brief introduction to the drawings used in the description of the examples or related technology will be provided below. It is evident that the drawings described below are only some examples of this application, and for those skilled in the art, other drawings can be obtained based on these drawings without any creative effort.

REFERENCE MARKINGS IN THE DRAWINGS

10, frame; 11, first joint structure; 111, plastic part; 111*a*, first positioning structure; 111*b*, first hollow structure; 112, spring clip; 112*a*, second positioning structure; 112*b*, second hollow structure; 113, bending structure; 113*a*, opening; 12, pivot axle; 13, first clamping mechanism; 14, second clamping mechanism; 15, connecting mechanism; 16, second joint structure; 161, joint piece; 17, rotational clearance; 181, first connecting surface; 182, second connecting surface; 183, rotating piece; 183*a*, mounting hole; 184, accommodating slot; 191, memory metal strip; 192, mounting piece; 192*a*, limiting hole; 21, first earphone unit; 22, second earphone unit.

BRIEF DESCRIPTION

To make the objectives, technical solutions, and advantages of this application clearer and more comprehensible, the following detailed description of the application is provided in conjunction with the accompanying drawings and examples. It should be understood that the specific examples described herein are only used to explain this application and are not intended to limit the scope of this application.

This application provides a headband and headphones designed to address the issue that headbands generally have a large spatial volume and has limited adjustability, resulting in the headbands occupying a significant amount of storage space and being inconvenient to carry it around when stored.

Figure 1:
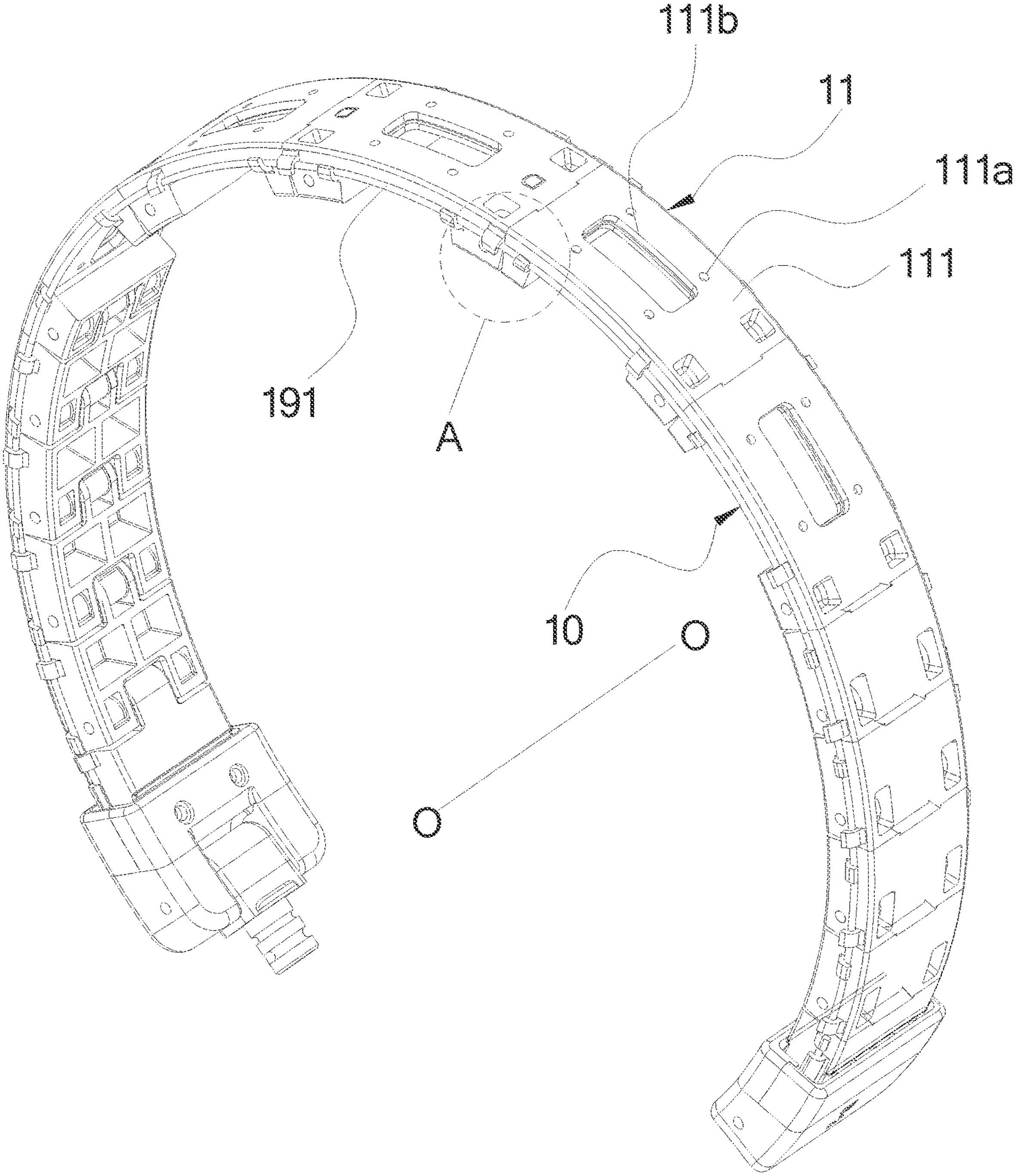
FIG. 1 is a schematic structural diagram of a headband in an embodiment of this application.
Figure 6:
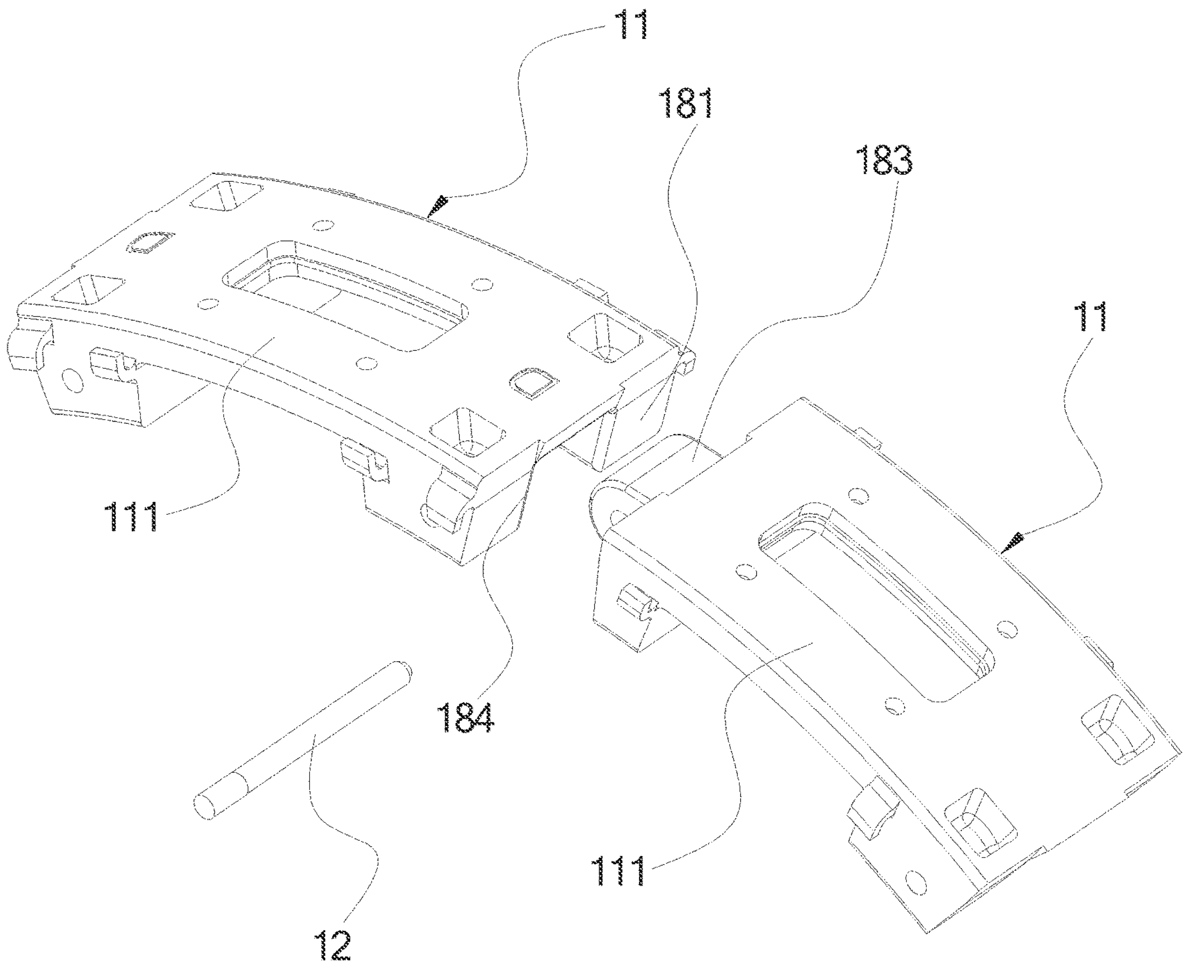
FIG. 6 is a schematic structural diagram of two adjacent joint structures in an embodiment of this application.

In a first aspect, this application provides a headband, as shown in FIG. 1, which comprises an arc-shaped frame 10. The frame 10 comprises multiple joint structures and multiple pivot axles 12 (as shown in FIG. 6); the multiple joint structures are arranged along the extension direction (i.e., the length direction) of the frame 10, with adjacent joint structures connected by one or two pivot axles 12. The axial direction (i.e., the length direction) of the pivot axle 12 is parallel to the axial direction of the frame 10 (the OO direction in FIG. 1). Adjacent joint structures can rotate relative to each other around the axial direction of one or the pair of oppositely arranged pivot axles 12, allowing the frame 10 to switch between a folded state and an unfolded state.

It is understandable that, in an example of a headband application for over-ear headphones, the headband is used to connect with the earphone units and can secure the earphone units on the user's head. When the headband is in use, such as when it is worn on the head, the frame 10 is in an expanded state, meaning the headband is expanded and occupies a larger volume of space. In this application, the frame 10 serves as the main structural body of the headband. The frame 10 also provides mounting interfaces and support for other components. The frame 10 includes multiple joints that can rotate relative to each other. Therefore, when the headband is not in use, it can be folded by rotating each joint structure around the pivot axle 12, causing the frame 10 to enter a folded state. This folding action reduces the headband's volume significantly, making it more convenient to carry.

Figure 2:
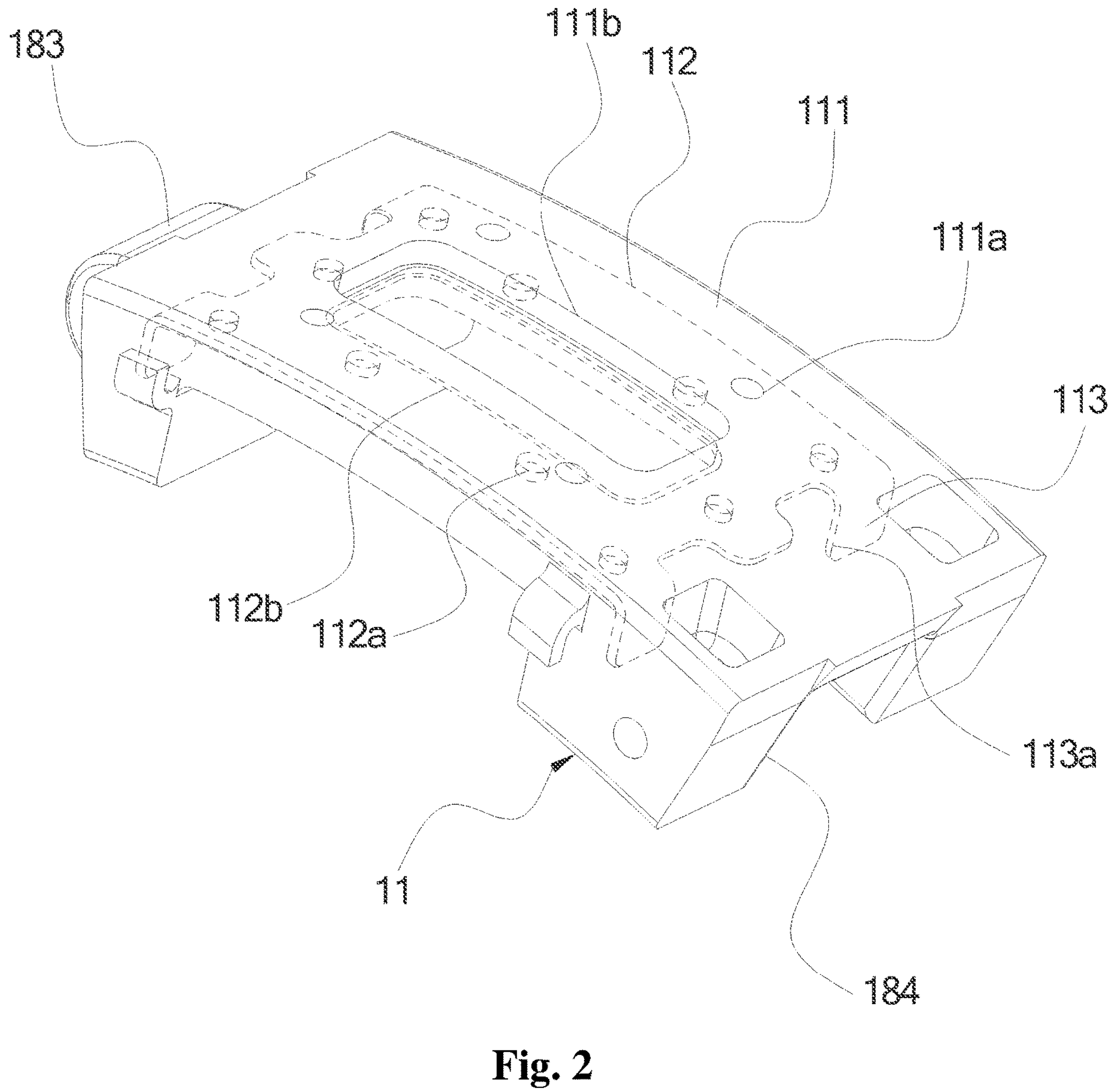
FIG. 2 is a schematic structural diagram of a first joint structure in an embodiment of this application.
Figure 3:
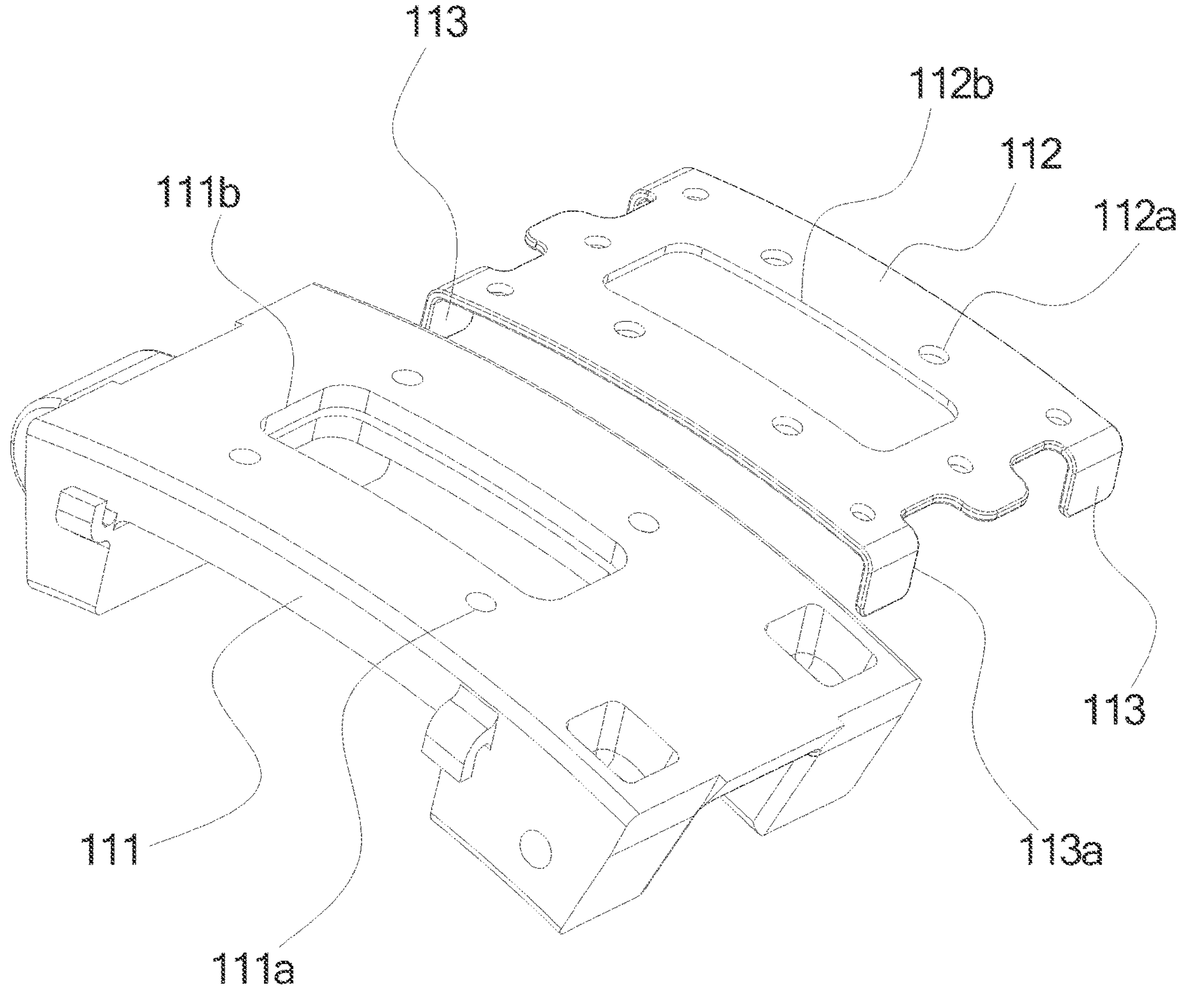
FIG. 3 is a schematic diagram of the components of the first joint structure in an embodiment of this application.

It should be noted that the structures of the multiple joint structures can be the same or different; this application does not impose specific limitations. As shown in FIGS. 2 and 3, the multiple joint structures include a first joint structure 11, which comprises a plastic part 111 and a spring clip 112. The plastic part 111 and the spring clip 112 are integrally molded by injection-molding.

It should be noted that the spring clip 112 has a certain degree of elasticity, and when the headband is worn on the head, the spring force of the spring clip 112 maintains a good clamping force while the headband is in the expanded state, ensuring a firm connection between the headband and the head to prevent the headband from falling or slipping off the head. In addition, the plastic part 111 has the advantages of being lightweight, having a simple manufacturing process, and high processing precision. Integrating the plastic part 111 with the spring clip 112 through injection-molding to form the first joint structure 11 can reduce the overall weight and manufacturing difficulty of the first joint structure 11, and improve the processing precision of the first joint structure 11, making the assembly between each first joint structure 11 more precise. At the same time, the spring clip 112 and the plastic part 111 are not easily separated, making the overall performance of the first joint structure 11 more stable and less prone to disassembly or loosening.

In an example of this application, the structural strength of the spring clip 112 is greater than that of the plastic part 111. Structural strength refers to the ability of an object to resist breaking, which can enhance the overall structural strength of the first joint structure 11, making the overall performance of the first joint structure 11 more stable and less likely to break when the headband is bent.

Preferably, the material used to make the spring clip 112 can be an elastic metal, such as spring steel or spring copper, etc., which can increase the structural strength of the first joint structure 11 while enhancing its elasticity, ensuring a more secure connection between the headband and the head when the headband is worn. Based on actual needs, the material for the spring clip 112 can also be elastic plastic or other materials.

In one example of this application, the plastic part 111 has a hollow cavity, and the spring clip 112 is located inside the hollow cavity. It is understandable that when forming the first joint structure 11, the pre-prepared spring clip 112 can be placed inside the mold, then molten plastic is injected into the mold and used to wrap the spring clip 112. As the plastic wraps around the spring clip 112, a hollow cavity is formed inside the plastic part 111. This design can further enhance the connection strength between the spring clip 112 and the plastic part 111, preventing separation during the bending process of the headband.

In another example of this application, the spring clip 112 can also be stacked on the outer or inner surface of the plastic part 111. It should be noted that the outer surface of the plastic part 111 refers to the surface that is away from the head when the headband is worn, while the inner surface of the plastic part 111 refers to the surface that faces towards the head when the headband is worn. When forming the first joint structure 11, the pre-prepared spring clip 112 can also be placed inside the mold, followed by the injection of plastic into the mold. The plastic then forms on the surface of the spring clip 112, allowing the spring clip 112 to be stacked on the outer or inner surface of the plastic part 111. This design facilitates the user's observation of the spring clip 112, and in case of damage to the spring clip 112, it allows for timely repair or replacement of the first joint structure 11.

In an example of this application, the plastic part 111 is provided with a first positioning structure 111*a*, and a portion of the spring clip 112 is located within the first positioning structure 111*a*; and/or, the spring clip 112 is provided with a second positioning structure 112*a*, and a portion of the plastic part 111 is located within the second positioning structure 112*a*. It should be noted that the use of the first positioning structure 111*a* and the second positioning structure 112*a* can provide positioning for the spring clip 112, ensuring that the spring clip 112 is accurately installed at the designed location. Additionally, the first positioning structure 111*a* and the second positioning structure 112*a* can also enhance the connection strength between the spring clip 112 and the plastic part 111, preventing relative movement between the spring clip 112 and the plastic part 111.

The first positioning structure 111*a* may include structures such as positioning holes and/or slots located on the plastic part 111, with the spring clip 112 being provided with protruding structures, such as positioning posts. When the spring clip 112 and the plastic part 111 are integrally molded by injection, the molten plastic wraps around the protruding structures to form the positioning holes and/or slots. The second positioning structure 112*a* may also include structures such as positioning holes and/or slots located on the spring clip 112. When the spring clip 112 and the plastic part 111 are integrally molded by injection, the molten plastic enters and solidifies within the positioning holes and/or slots.

In an example of this application, the end of the spring clip 112 is provided with a bending structure 113, which is integrally molded with the spring clip 112 by injection molding. It is understandable that when the spring clip 112 is integrally molded with the plastic part 111 by injection molding, the molten plastic will wrap around the bending structure 113, which can increase the contact area between the spring clip 112 and the plastic part 111, thereby further enhancing the connection strength between the spring clip 112 and the plastic part 111, and preventing separation during the bending process of the headband. Additionally, the plastic part 111 can limit the position of the spring clip 112 in various directions through the bending structure 113, preventing relative movement between the spring clip 112 and the plastic part 111.

The bending structure 113 can be bent inward towards the plastic part 111, or it can be bent outward away from the plastic part 111. Preferably, the bending structure 113 can be integrally formed with the spring clip 112 to enhance the connection strength between the spring clip 112 and the bending structure 113. In this case, the bending structure 113 can be formed by bending a portion of the end of the spring clip 112. Preferably, both ends of the spring clip 112 can be provided with the bending structure 113 to further enhance the connection strength between the spring clip 112 and the plastic part 111.

In an example of this application, an opening 113*a* is provided on the bending structure 113. It can be understood that when the spring clip 112 is integrally injection-molded with the plastic part 111, the molten state fills in the opening 113*a*, thereby wrapping the bending structure 113 more tightly, which can further enhance the connection strength between the spring clip 112 and the plastic part 111, as well as strengthen the positional limitation of the plastic part 111 in all directions on the spring clip 112.

In an example of this application, the plastic part 111 is provided with a first hollow structure 111*b*, which penetrates the outer and inner surfaces of the plastic part 111, and the spring clip 112 is provided with a second hollow structure 112*b* corresponding to the first hollow structure 111*b*. It can be understood that the first hollow structure 111*b* and the second hollow structure 112*b* can reduce the contact area and weight between the first joint structure 11 and the top of the head, thereby reducing the pressure on the top of the head; in addition, the elasticity of the spring clip 112 can be adjusted through the design of the second hollow structure 112*b*; the elasticity of the spring clip 112 can also be adjusted based on certain aspects such as the thickness of the spring clip 112. The volume of the first hollow structure 111*b* and the second hollow structure 112*b* can be selected according to actual needs, and this application does not impose specific restrictions.

Figure 4:
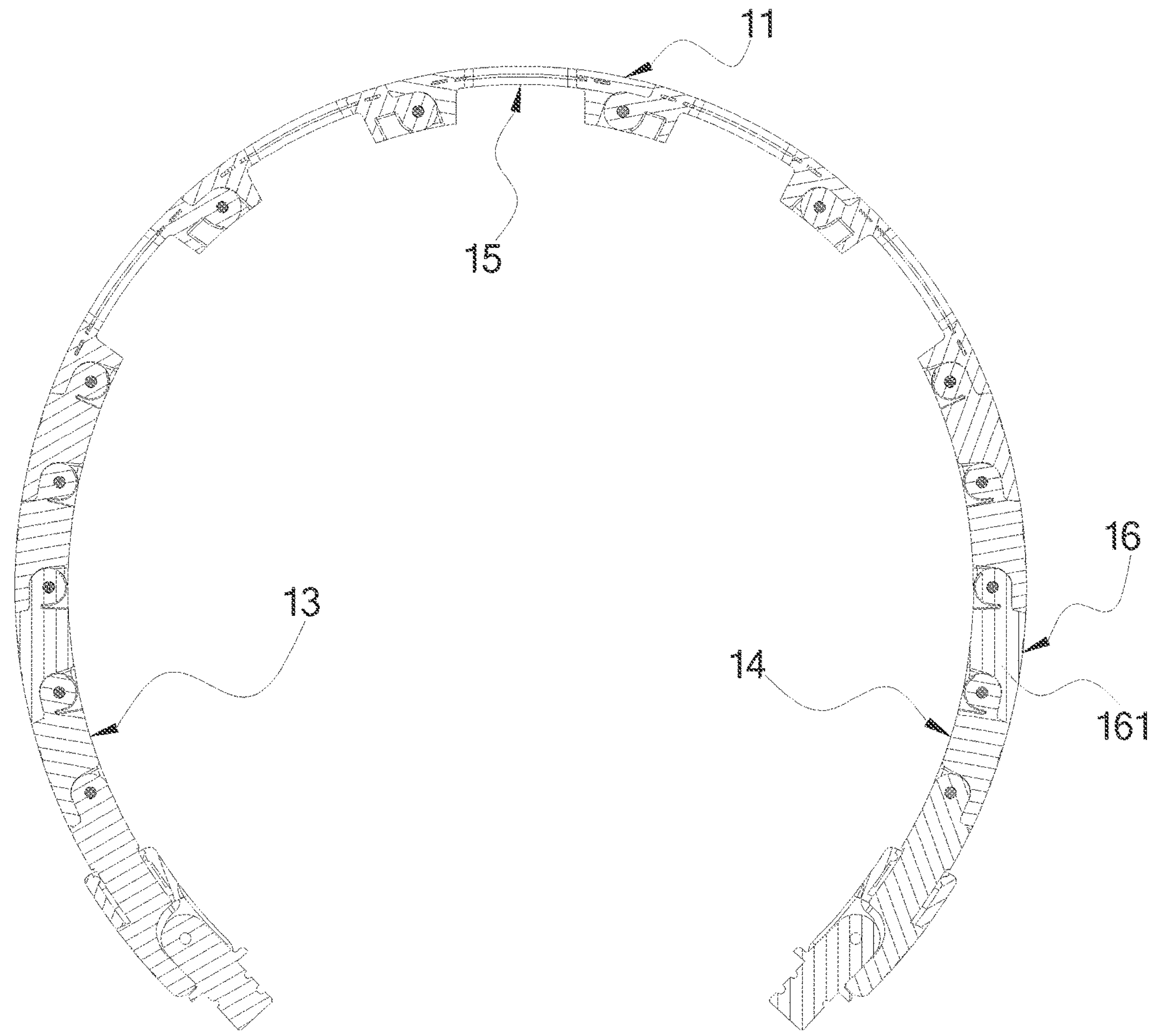
FIG. 4 is a schematic structural diagram of a headband in an embodiment of this application.

As shown in FIG. 4, the frame 10 comprises a first clamping mechanism 13, a second clamping mechanism 14, and a connecting mechanism 15; the second clamping mechanism 14 is set opposite to the first clamping mechanism 13; the connecting mechanism 15 is located between the first clamping mechanism 13 and the second clamping mechanism 14, with one end of the connecting mechanism 15 rotatably connected to the first clamping mechanism 13 through a pivot axle 12, and the other end rotatably connected to the second clamping mechanism 14 through another pivot axle 12.

The connecting mechanism 15 is formed by sequentially connecting multiple first joint structures 11. It can be understood that when the headband is worn on the head, the connecting mechanism 15 is located at the top part of the head, with the first clamping mechanism 13 and the second clamping mechanism 14 located on either side of the head, respectively. The combined clamping force of the first clamping mechanism 13 and the second clamping mechanism 14 is used to secure the headband on the head; the connecting mechanism 15 is formed by sequentially connecting multiple first joint structures 11. The elasticity of the first joint structures 11 can provide greater clamping force for the first and second clamping mechanisms, ensuring a more secure connection between the headband and the head, and preventing the headband from falling off the head.

Further, multiple joint structures also comprise a second joint structure 16. The first clamping mechanism 13 is formed by connecting multiple second joint structures 16 in sequence, and the second clamping mechanism 14 is formed by connecting another set of multiple second joint structures 16 in sequence. The second joint structure 16 is different from the first joint structure 11 in configuration. Specifically, the second joint structure 16 can include a joint piece 161, which can also be a part formed from plastic. It is understandable that, compared to the first joint structure 11, the second joint structure 16 has a simpler configuration, and it may include parts made from plastic without components such as a spring clip 112, which can reduce the weight of the second joint structure 16, thereby reducing the overall weight of the headband and enhancing the comfort of the user wearing the headband.

Furthermore, the first clamping mechanism 13 and the second clamping mechanism 14 can be symmetrically distributed at the two ends of the connecting mechanism 15.

It should also be noted that all the first joint structures 11 in the connecting mechanism 15 can have the same or different configurations, all the second joint structures 16 in the first clamping mechanism 13 can have the same or different configurations, and all the second joint structures 16 in the second clamping mechanism 14 can have the same or different configurations. In some examples, the connecting mechanism 15 has at least two first joint structures. In some examples, the connecting mechanism 15 has at least three first joint structures. In some examples, the connecting mechanism 15 has at least four first joint structures. In some examples, the connecting mechanism 15 has at least five first joint structures. In some examples, the first clamping mechanism 13 and the second clamping mechanism 14 each has at least one second joint structures. In some examples, the first clamping mechanism 13 and the second clamping mechanism 14 each has at least two second joint structures. In some examples, the first clamping mechanism 13 and the second clamping mechanism 14 each has at least three second joint structures. In some examples, the first clamping mechanism 13 and the second clamping mechanism 14 each has at least four second joint structures. In some examples, the first clamping mechanism 13 and the second clamping mechanism 14 each has at least five second joint structures.

Figure 5:
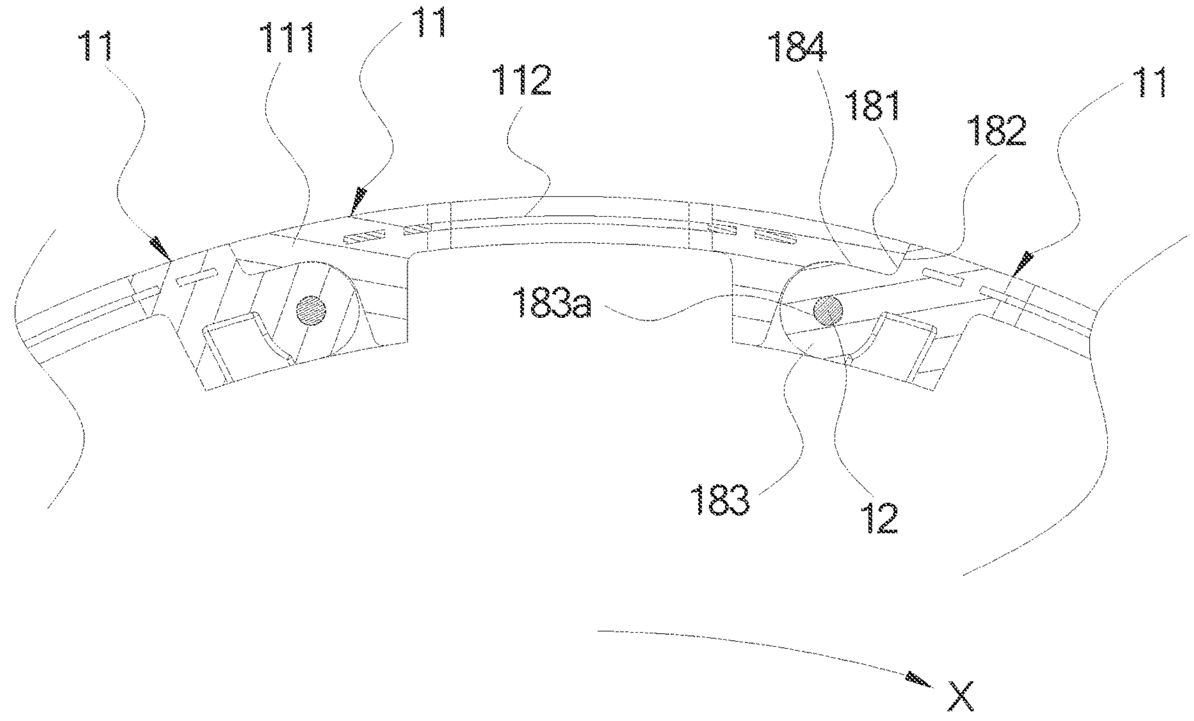
FIG. 5 is a schematic diagram of a partial structure of a headband in an embodiment of this application.

As shown in FIGS. 5 and 6, in some examples of this application, two adjacent joint structures have mutually facing first connecting surfaces 181 and second connecting surfaces 182. Among the adjacent joint structures, the one with the first connecting surface 181 is equipped with an accommodating slot 184, and the one with the second connecting surface 182 is equipped with a rotating piece 183. The accommodating slot 184 has a slot opening located on the first connecting surface 181, and the rotating piece 183 is positioned on the second connecting surface 182. The rotating piece 183 is inserted through the slot opening into accommodating slot 184. The rotating piece 183 is provided with a mounting hole 183*a*, which extends axially along the pivot axle 12 and penetrates through the rotating piece 183. The pivot axle 12 is threaded through the mounting hole 183*a*, and the adjacent joint structures are rotationally connected through the rotating member 183 and the pivot axle 12. The accommodating slot 184 extends inwardly towards the frame 10 to form a clearance notch that allows for the rotation of the rotating piece 183.

When the frame 10 is in the expanded state, the part of the first connection surface 181 that is far from the inside of the frame 10 and opposite the accommodating slot 184 abuts against the second connection surface 182. It can be understood that by inserting the rotating piece 183 into the accommodating slot 184, the connection between two adjacent joint structures is achieved, which can reduce the gap between them, thereby reducing the overall spatial volume of the headband. Moreover, the clearance notch provides rotational space for the rotating piece 183, allowing it to rotate towards the inside of the frame 10 around the axial direction of the pivot axle 12 when the frame 10 is in the expanded state, enabling the frame 10 to enter a folded state. Additionally, when the frame 10 is in the expanded state, the abutment of the first connection surface 181 against the second connection surface 182 ensures that the joint structures can only rotate towards the inside of the frame 10 (in the X direction as shown in FIG. 5) to enter a folded state, and cannot rotate away from the inside of the frame 10, thus preventing reverse folding.

It should be noted that among the adjacent joint structures, the pivot axle 12 may be fixedly connected to one joint structure, and the rotating piece 183 may be fixedly connected to the other joint structure, with the rotating piece 183 being rotationally connected around the axial direction of the pivot axle 12, thereby achieving the rotational connection between the two adjacent joint structures. Alternatively, the pivot axle 12 may be rotationally connected around its axis to one joint structure, and the rotating piece 183 may be fixedly connected to the other joint structure, with the rotating piece 183 being fixedly connected to the pivot axle 12, which can also achieve the rotational connection between the two adjacent joint structures.

Figure 7:
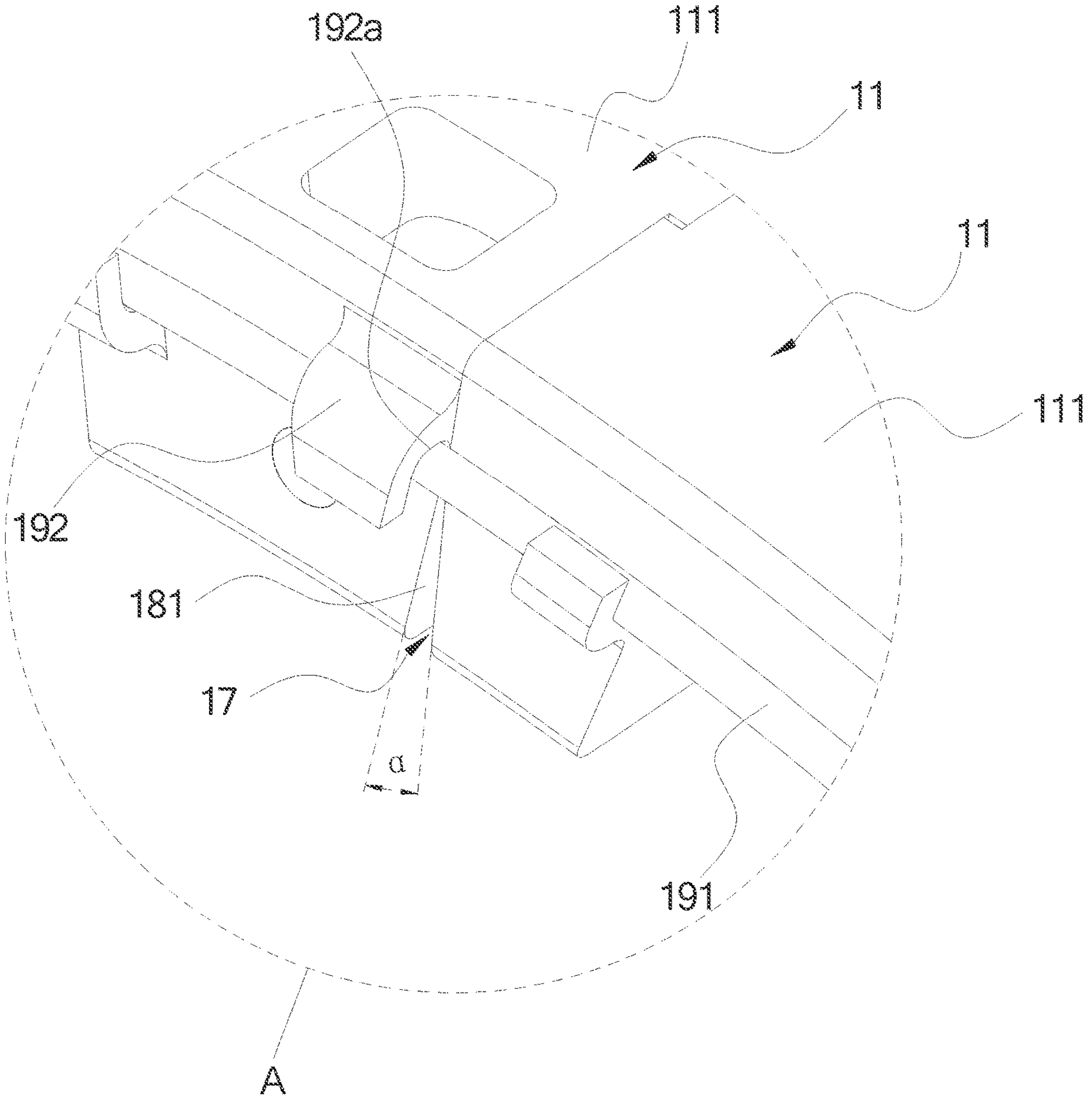
FIG. 7 is an enlarged schematic view of the area A in FIG. 1.

As shown in FIG. 7, in some examples of this application, when the frame 10 is in an expanded state, there is a rotational clearance 17 between two adjacent joint structures. The end of the rotational clearance 17 facing the inside of the frame 10 is an opening 113*a*. It can be understood that the rotational clearance 17 can provide rotational space for the joint structure to rotate towards the inside of the frame 10 to allow the frame 10 to enter a folded state.

Furthermore, the spacing of the rotational clearance 17 gradually increases in the direction closer to the inside of the frame 10. It can be understood that, instead of setting the width of the gaps at each part of the rotational clearance 17 to be the same, for example, the overall shape of the rotational clearance 17 being rectangular, the examples of this application set the rotational clearance 17 to be generally in an inverted V-shape. This means that the spacing of the rotational clearance 17 gradually increases in the direction closer to the inside of the frame 10, which can reduce the spatial volume of the rotational clearance 17 between two adjacent joint structures without affecting the rotation of the joint structures. As a result, the overall spatial volume of the frame 10 in the expanded state is smaller. Moreover, after the joint structures rotate towards the inside of the frame 10 to enter a folded state, the rotational clearance 17 can be substantially eliminated, thereby further reducing the spatial volume of the headband in the folded state.

Specifically, when the frame 10 is in an expanded state, a rotational clearance 17 is formed between the first connecting surface 181 and the second connecting surface 182. It can be understood that when the frame 10 is in an expanded state, at least a part of the first connecting surface 181 and the second connecting surface 182 are not in contact, forming a V-shaped rotational clearance 17.

When the frame 10 is in an expanded state, the angle formed between the first connecting surface 181 and the second connecting surface 182 is $\alpha$, which can be 5 degrees to 10 degrees, preferably 8 degrees, to ensure that the joint structure has sufficient rotational space, while also avoiding an excessively large gap between adjacent joint structures that would lead to an overly large volume of the headband.

Refer to FIG. 7 for continuation. In one example of this application, a memory metal strip 191 is arranged on the side of the frame 10. The memory metal strip 191 extends along the extending direction of the frame 10 and is connected to the frame 10, and the frame 10 is maintained, for example, in an unfolded state under the action of the memory metal strip 191. The material for preparing the memory metal strip 191 can be, for example, a nickel-titanium alloy. Shape memory alloys have the property of being able to remember their original shape and return to that shape under certain conditions after being deformed. In one example, by arranging the memory metal strip 191 on the side of the frame 10, the original shape of the memory metal strip 191 can be designed to be the same or similar to the shape of the frame 10 when it is in an unfolded state. In this way, the memory metal strip 191 can provide a certain restoring force when returning the headband to the unfolded state. In another example, the original shape of the memory metal strip 191 can also be designed to be the same as the shape of the frame 10 when it is in a folded state, so that the memory metal strip 191 can provide a restoring force to return the headband to the folded state after it is unfolded, thereby giving the headband a greater clamping force when worn on the head. The specific working principle of the shape memory alloy has been disclosed in related technology, and this application will not elaborate further.

Furthermore, the memory metal strip 191 can be arranged on only one side of the frame 10 along the axial direction of the pivot axle 12, or on both sides along the axial direction of the pivot axle 12.

Specifically, in one example of this application, multiple mounting components 192 are arranged on the frame 10. The multiple mounting components 192 are spaced apart along the extending direction of the frame 10, and the mounting components 192 are provided with limiting holes 192*a*, through which the memory metal strip 191 is threaded. The limiting holes 192*a* are used to limit the position of the memory metal strip 191 to prevent it from separating from the frame 10.

Figure 8:
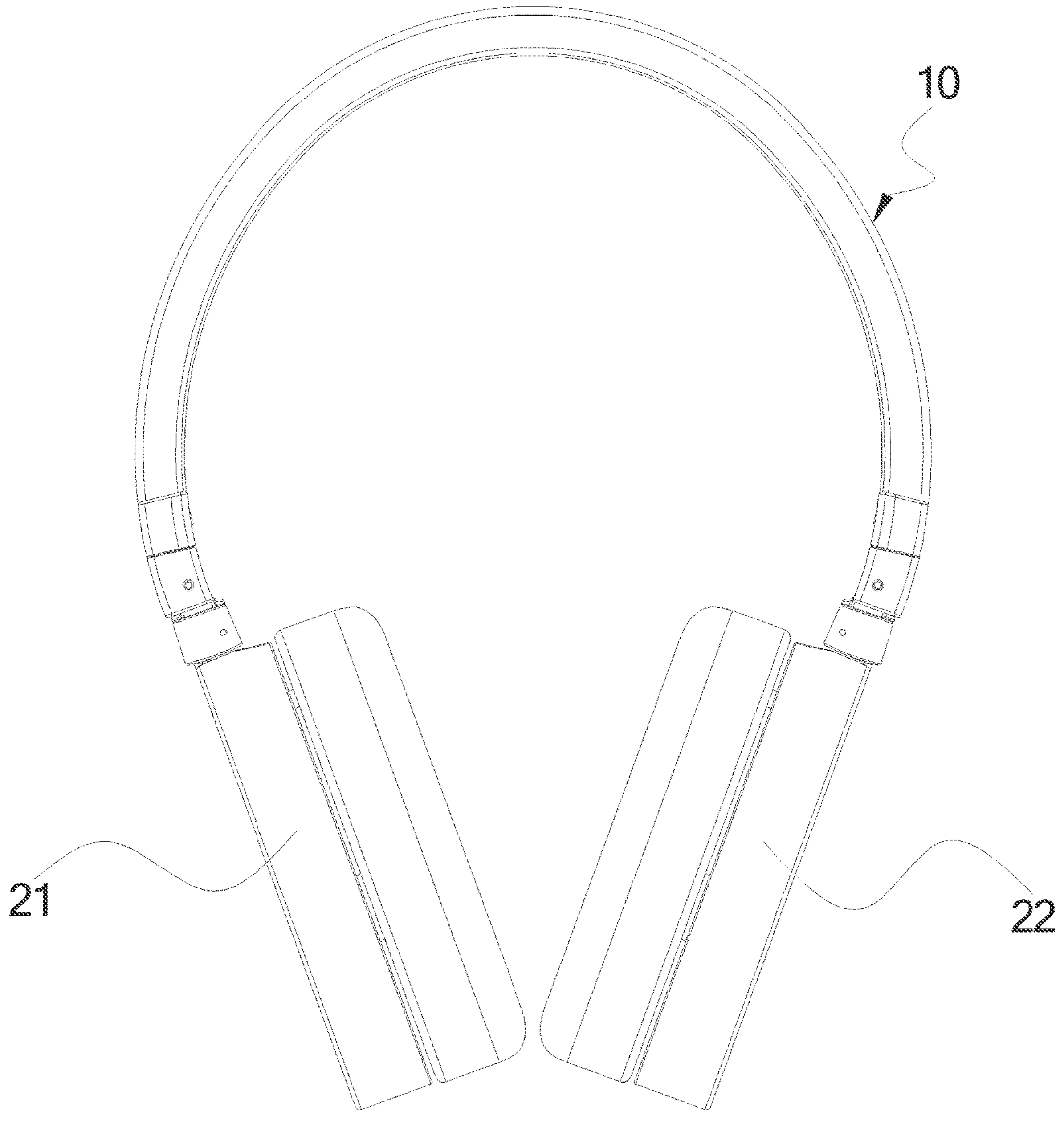
FIG. 8 is a schematic structural diagram of headphones in an embodiment of this application.

Based on the aforementioned headband, this application also provides a pair of headphones, as shown in FIG. 8. The headphones include a first earphone unit 21, a second earphone unit 22, and a headband as described in any of the aforementioned examples. The first earphone unit 21 is connected to one end of the headband's frame 10, and the second earphone unit 22 is connected to the other end of the headband's frame 10.

The headphones include the over-the-head type, which can be either wired or wireless. One of the first earphone unit 21 and the second earphone unit 22 can be the left earphone unit, and the other can be the right earphone unit.

The above descriptions are only the examples of this application and are not intended to limit the scope of this application. Any modifications, equivalent substitutions, and improvements made within the spirit and principles of this application should be included within the scope of protection of this application. For example, the headband disclosed herein can include sound isolating ear protecting units at its distal ends to enable use for what is commonly known as ear muffs. Alternatively, the headband disclosed herein can include ear covering material and structure at its distal ends to enable use for what is also commonly known as ear warmers.

What is claimed is:

1. A headband comprising:

a frame with an arc shape having a plurality of joint structures arranged along an extension direction of the frame, wherein at least one of the plurality of joint structures comprises a plastic part and a spring clip, with the plastic part being integrally injection-molded with the spring clip; and a plurality of pivot axles, wherein at least one pivot axle, of the plurality of pivot axles, rotationally connects two adjacent joint structures, an axial direction of the at least one pivot axle is parallel to an axial direction of the frame, and the two adjacent joint structures are configured to rotate relative to each other around the axial direction of the at least one pivot axle, allowing the frame to switch between a folded state and an unfolded state.

2. The headband according to claim 1, wherein a structural strength of the spring clip is greater than a structural strength of the plastic part.

3. The headband according to claim 1, wherein the plastic part has a hollow cavity, and the spring clip is:

located inside the hollow cavity; or stacked on an outer surface or an inner surface of the plastic part.

4. The headband according to claim 1, wherein the plastic part is provided with a first positioning structure, and a part of the spring clip is located inside the first positioning structure; or the spring clip is provided with a second positioning structure, and a portion of the plastic part is located inside the second positioning structure.

5. The headband according to claim 1, wherein an end of the spring clip is provided with a bending structure, which is integrally injection-molded with the spring clip.

6. The headband according to claim 5, wherein the bending structure is provided with an opening.

7. The headband according to claim 1, wherein the two adjacent joint structures have a first connecting surface and a second connecting surface facing each other, and wherein the two adjacent joint structures comprises a first joint structure and a second joint structure, the first joint structure with the first connecting surface is provided with an accommodating slot, and the second joint structure with the second connecting surface is provided with a rotating piece.

8. The headband according to claim 7, wherein the accommodating slot has a slot opening located at the first connecting surface, and the rotating piece is located at the second connecting surface and is inserted into the accommodating slot through the slot opening, and wherein the rotating piece is provided with a mounting hole, which extends axially along the at least one pivot axle and penetrates the rotating piece.

9. The headband according to claim 8, wherein the at least one pivot axle is inserted into the mounting hole, and the two adjacent joint structures are rotationally connected through the rotating piece and the at least one pivot axle, and wherein the accommodating slot extends inwardly towards the frame to form a clearance notch for a rotation of the rotating piece.

10. The headband according to claim 9, wherein when the frame is in an expanded state, a portion of the first connecting surface that is away from an inside of the frame at the accommodating slot abuts against the second connecting surface.

11. The headband according to claim 1, the frame further comprises:

a first clamping mechanism;

a second clamping mechanism set opposite to the first clamping mechanism; and a connecting mechanism located between the first clamping mechanism and the second clamping mechanism, wherein one end of the connecting mechanism is rotatably connected to the first clamping mechanism through a first pivot axle, and other end of the connecting mechanism is rotatably connected to the second clamping mechanism through a second pivot axle, wherein the plurality of joint structures further comprises a series of first joint structures, and wherein the connecting mechanism is formed by the series of first joint structures connected in sequence.

12. The headband according to claim 11, wherein the plurality of joint structures further comprises a series second joint structures, wherein the first clamping mechanism is formed by the series of second joint structures connected in sequence, the second clamping mechanism is formed by the series of second joint structures connected in sequence, and wherein the series of second joint structures are different in structure from the series of first joint structures.

13. A pair of headphones comprising:

a first earphone unit, a second earphone unit, and a headband including first and second ends which are connected respectively to the first and second earphone units, the headband further including a frame with an arc shape having:

a plurality of joint structures arranged along an extension direction of the frame, wherein at least one of the plurality of joint structures comprises a plastic part and a spring clip, with the plastic part being integrally injection-molded with the spring clip; and a plurality of pivot axles, wherein at least one pivot axle, of the plurality of pivot axles, rotationally connects two adjacent joint structures, an axial direction of the at least one pivot axle is parallel to an axial direction of the frame, and the two adjacent joint structures are configured to rotate relative to each other around the axial direction of the at least one pivot axle, allowing the frame to switch between a folded state and an unfolded state.

14. The pair of headphones according to claim 13, wherein a structural strength of the spring clip is greater than a structural strength of the plastic part.

15. The pair of headphones according to claim 14, wherein the plastic part has a hollow cavity, and the spring clip is:

located inside the hollow cavity; or stacked on an outer surface or an inner surface of the plastic part.

16. The pair of headphones according to claim 13, wherein the plastic part is provided with a first positioning structure, wherein a part of the spring clip is located inside the first positioning structure; or the spring clip is provided with a second positioning structure, and a portion of the plastic part is located inside the second positioning structure.

17. The pair of headphones according to claim 13, wherein an end of the spring clip is provided with a bending structure, which is integrally injection-molded with the spring clip.

18. The pair of headphones according to claim 13, wherein the two adjacent joint structures have a first connecting surface and a second connecting surface facing each other, and wherein the two adjacent joint structures comprise a first joint structure and a second joint structure, the first joint structure with the first connecting surface is provided with an accommodating slot, and the second joint structure with the second connecting surface is provided with a rotating piece, wherein the accommodating slot has a slot opening located at the first connecting surface, and the rotating piece is located at the second connecting surface and is inserted into the accommodating slot through the slot opening, and wherein the rotating piece is provided with a mounting hole, which extends axially along the at least one pivot axle and penetrates the rotating piece, wherein the at least one pivot axle is inserted into the mounting hole, and the two adjacent joint structures are rotationally connected through the rotating piece and the at least one pivot axle, and wherein the accommodating slot extends inwardly towards the frame to form a clearance notch for a rotation of the rotating piece, and wherein, when the frame is in an expanded state, a portion of the first connecting surface that is away from an inside of the frame at the accommodating slot abuts against the second connecting surface.

19. The pair of headphones according to claim 13, wherein the frame further comprises a memory metal strip arranged on a side of the frame and extending along an extending direction of the frame, and wherein the memory metal strip is configured to have an original shape substantially similar to a shape of the frame in the unfolded state, and wherein the memory metal strip provides a restoring force returning the headband to the unfolded state.

20. The pair of headphones according to claim 13, wherein the frame further comprises a memory metal strip arranged on a side of the frame and extending along an extending direction of the frame, and wherein the memory metal strip is configured to have an original shape substantially similar to a shape of the frame in the folded state, and wherein the memory metal strip provides a restoring force returning the headband to the folded state after it is unfolded.

21. A pair of headphones comprising:

a first earphone unit, a second earphone unit, and a headband comprising first and second ends which are connected respectively to the first and second earphone units, the headband further comprising a frame with an arc shape having at least five joint structures arranged in series along an extension direction of the frame, wherein each joint structure is pivotally coupled to adjacent joint structures, and wherein at least one of the at least five joint structures comprises a plastic part and a spring clip, with the plastic part being integrally injection-molded with the spring clip.

* * * * *